(12) United States Patent
Kim et al.

(10) Patent No.: US 6,662,799 B2
(45) Date of Patent: Dec. 16, 2003

(54) VERTICAL WAFER SAWING APPARATUS

(75) Inventors: Dong-Kuk Kim, Chungchungnam-dong (KR); Seung-Chul Ahn, Chungchungnam-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 54 days.

(21) Appl. No.: 09/974,409

(22) Filed: Oct. 9, 2001

(65) Prior Publication Data

US 2002/0063115 A1 May 30, 2002

(30) Foreign Application Priority Data

Nov. 27, 2000 (KR) .......................... 2000-70968

(51) Int. Cl.[7] ................................. B28D 1/02
(52) U.S. Cl. .................... 125/12; 125/13.01; 438/462
(58) Field of Search ................. 219/121.67, 121.72, 219/121.82; 451/212, 213, 218, 221, 41; 125/13.01, 13.02, 12, 14, 15, 23.01; 438/460, 462, 401, 114, 42; 83/51, 869, 885

(56) References Cited

FOREIGN PATENT DOCUMENTS

JP 04348546 A * 12/1992 .......... H01L/21/78

* cited by examiner

Primary Examiner—George Nguyen
Assistant Examiner—David B. Thomas
(74) Attorney, Agent, or Firm—Marger Johnson & McCollom, P.C.

(57) ABSTRACT

A vertical wafer sawing apparatus for separating semiconductor devices formed on a semiconductor wafer includes a chuck table disposed vertically to a supporting surface of the chuck table and a scribing member moving perpendicular to the wafer surface to dice the wafer. The chuck table or a scribing member moves in one specific direction at least among the directions of the x, y and z-axis. The direction of the x-axis runs perpendicular to a wafer stage, on which a wafer is loaded, and parallel to the ground or the support surface for the chuck table. As a result, the set-up dimensions of the apparatus can be decreased even as wafer size increases. Further, contaminants such as silicon scraps and dust on the wafer can be efficiently removed during the wafer sawing process.

13 Claims, 8 Drawing Sheets

VERTICAL WAFER SAWING APPARATUS

BACKGROUND OF THE INVENTION

1. Field of the Invention

The present invention relates to an apparatus for manufacturing semiconductor devices and, more particularly, to a wafer sawing apparatus for separating a wafer into individual semiconductor chips.

2. Description of the Related Arts

After a well-known wafer fabrication process is performed a semiconductor wafer is cut and separated into individual semiconductor chips by a wafer sawing apparatus. The wafer sawing apparatus mostly uses a scribing blade as a cutter. Alternatively, a laser cutter may be used. The scribing blade rotates at high speed, and scribes the wafer along scribe lines. Therefore, the wafer is divided into a plurality of separate individual dices.

FIG. 1 is a plan view showing a conventional wafer sawing apparatus. FIG. 2 is a front view showing the conventional wafer sawing apparatus.

Referring to FIG. 1 and FIG. 2, a conventional wafer sawing apparatus 300 has a chuck table, on which a wafer 10 is fixedly mounted, and a scribing blade 321 which cuts the wafer 10 along scribe lines 13 in order to divide the wafer 10 into chips 11. The wafer sawing apparatus 200 further has a loader 330 in which a wafer cassette 20 containing the wafers 10 is placed, and transporters 340 and 350, which transfer the wafer 10 between the chuck table 311 and the wafer cassette 20.

As discussed, the wafer sawing apparatus 300 includes the first transporter 340 which puts the wafer 10 into the wafer cassette 20 or takes the wafer 10 out of the wafer cassette 20, and the second transporter 350 which rotates the wafer 10 at a predetermined angle and transfers the wafer 10 to the chuck table 311.

During the wafer sawing processing, the wafer 10 is being supported to a wafer ring 17 by an adhesive tape 15, which is attached to the backside of both the wafer 10 and the ring 17.

In the conventional wafer sawing apparatus 300, the first transporter 340 takes out the wafer 10 from the wafer cassette 20 placed on the loader 330, then the second transporter 350 transfers the wafer 10 to the chuck table 311. At this time, the second transporter 350 horizontally rotates the wafer 10.

Additionally, the first and second transporters 340, 350 have vacuum suction holes to affix the wafer 10 by vacuum suction force. The wafer 10 is stuck to the chuck table 311 by vacuum suction force. After affixing the wafer 10 to the chuck table 311, the scribing blade 321 cuts the wafer 10 along scribe lines so that the wafer 10 is separated into individual semiconductor chips 11.

The scribing blade 321 is rotated by a driving motor 323 and moved either in a direction of the y-axis by a y-axis driver 317 or in a direction of the z-axis by a z-axis driver 319. On the other hand, the chuck table 311 is moved in a direction of the x-axis by an x-axis driver 315. Herein, while the x-axis and the y-axis run are parallel to the ground, the z-axis runs perpendicular to the ground. In addition, the x-axis is perpendicular to the y-axis.

During scribing, silicon particles are produced as the scribing blade 321 abrades a surface of the wafer 10. These silicon particles may remain on the wafer 10 and cause defects in subsequent manufacturing processes. Therefore, the wafer sawing apparatus 300 has a spray nozzle 325 positioned on a side of the scribing blade 321 to spray a washing solution onto the scribing blade 321 and a top surface of the wafer 10. However, a cleaning operation by the washing solution still has limitations in effectively cleaning the wafer.

One of the approaches designed to overcome the limitations of using washing solution alone is disclosed in Japanese laid-open patent application No. 4-348546. The wafer sawing apparatus presented there is illustrated in FIG. 3. As shown in FIG. 3, the wafer sawing apparatus 400 has a revolving chuck table 411 on which a wafer 10 is mounted and to which a cylinder 417 is connected by a revolving unit 415. To effectively remove silicon particles, the cylinder 417 takes up the revolving chuck table 411 and thus the wafer 10 is positioned vertically. The scribing blade 421 is maneuverable along the x, y, and z axes, thereby controlling the sawing depth of the wafer 10. While the x-axis and the y-axis are parallel to the ground, the z-axis is perpendicular to the ground. In addition, the x-axis is perpendicular to the y-axis.

The conventional wafer sawing apparatus, including the wafer sawing apparatus shown in FIG. 3, has a drawback in that the chuck table occupies a relatively greater space since the chuck table lies horizontally. Therefore, the entire size of the wafer sawing apparatus becomes larger. Such a drawback becomes more serious if the wafer increases in size. For example, in the case of using 200-mm-diameter wafers (namely, 8-inch wafers), the wafer sawing apparatus covers an area of about 1.58 square meters (1.35 m' 1.17 m). In case of 300-mm-diameter wafers (namely, 12-inch wafers), the area of the wafer sawing apparatus increases about 2.55 square meters (1.82 m ' 1.4 m).

Consequently, there is a need for a wafer sawing apparatus that occupies a smaller space and removes contaminants such as silicon scraps and dust more efficiently.

SUMMARY OF THE INVENTION

A wafer sawing apparatus that has a smaller "footprint" than those of the prior art is provided. Also, a wafer sawing apparatus that can effectively remove silicon scraps and dust produced during the sawing process is provided.

In accordance with the preferred embodiment of the present invention, the wafer sawing apparatus comprises a vertical chuck table, which has a first surface to hold a wafer and a second surface connected to a driving member. The first and second surfaces of the chuck table are disposed substantially vertically to a support surface for the chuck table. The wafer sawing apparatus further includes a scribing member that moves perpendicular to the front surface of the wafer or the chuck table and separates the wafer into individual semiconductor chips. The apparatus further provides transporting members that transfer the wafer, and the wafer is then fixedly supported relative to the chuck table by the transporting members in an upright position.

The vertical chuck table or the scribing member is movable along the x, y or z-axis. Here, the direction of x-axis runs perpendicular to the wafer stage and parallel to the ground or the support surface for the chuck table, direction of y-axis runs parallel to the wafer stage and parallel to the ground, and direction of z-axis runs parallel to the wafer stage and perpendicular to the ground. Additionally, the scribing member may comprise one or more laser cutters or one or more scribing blades rotated by a driving motor, so that the scribing blade runs parallel to the ground or vertical to the ground.

As a result, the set-up dimensions of the apparatus can be decreased even as wafer size increases. Further, contaminants such as silicon scraps and dust on the wafer can be efficiently removed during the wafer sawing process.

BRIEF DESCRIPTION OF THE DRAWINGS

These and other objects, features and advantages of the present invention will be readily understood with reference to the following detailed description thereof provided in conjunction with the accompanying drawings, wherein like reference numerals designate like structural elements, in which.

DETAILED DESCRIPTION OF THE PREFERRED EMBODIMENTS

Preferred embodiments of the present invention will be described below with reference to the accompanying drawings.

Figure 1:
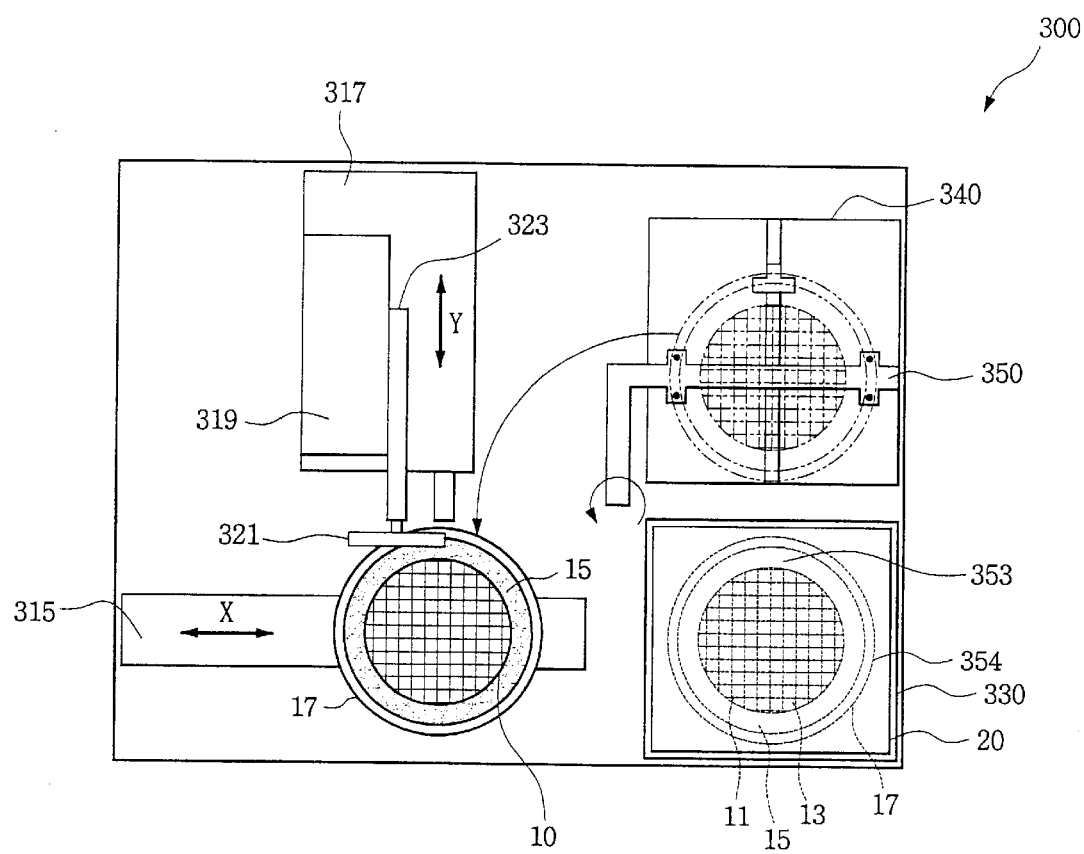
FIG. 1 is a plan view showing a conventional wafer sawing apparatus.
Figure 2:
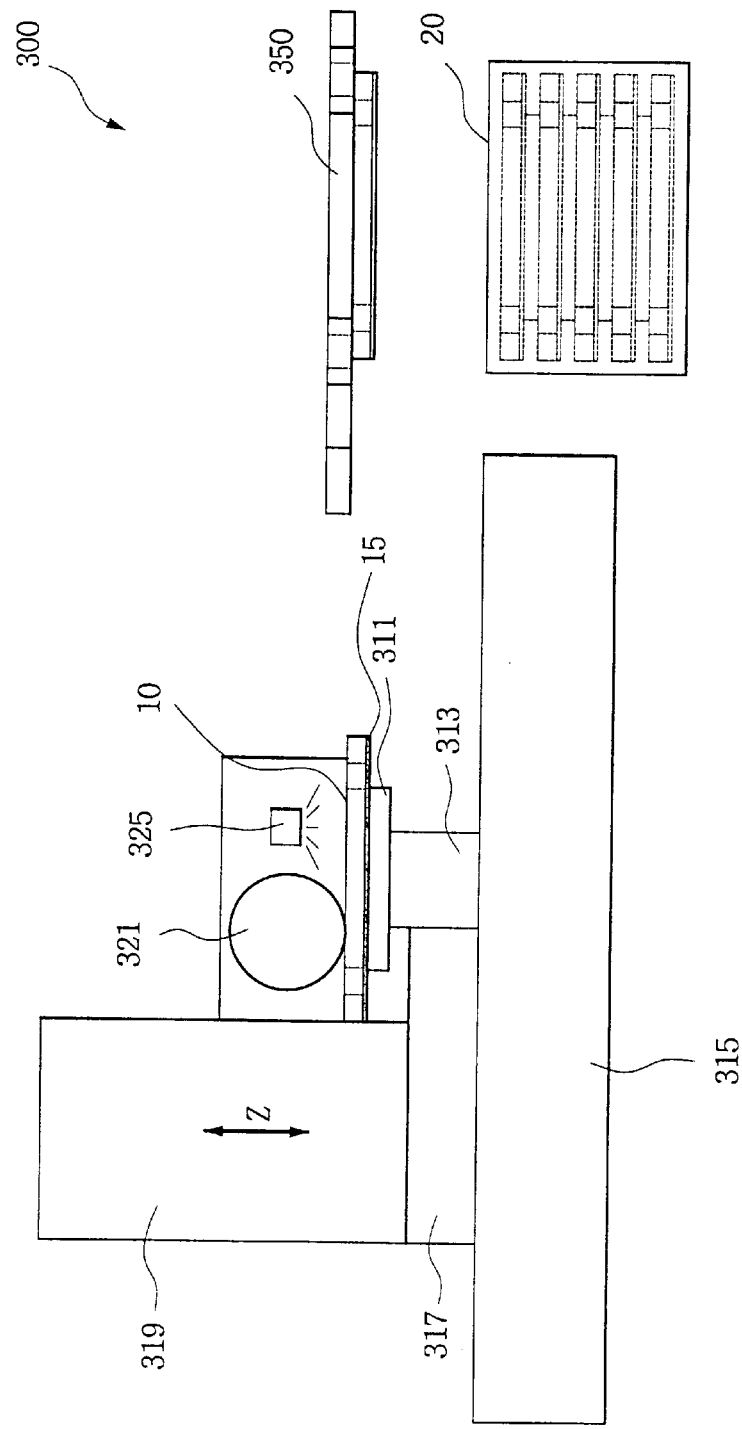
FIG. 2 is a front view showing a conventional wafer sawing apparatus.
Figure 3:
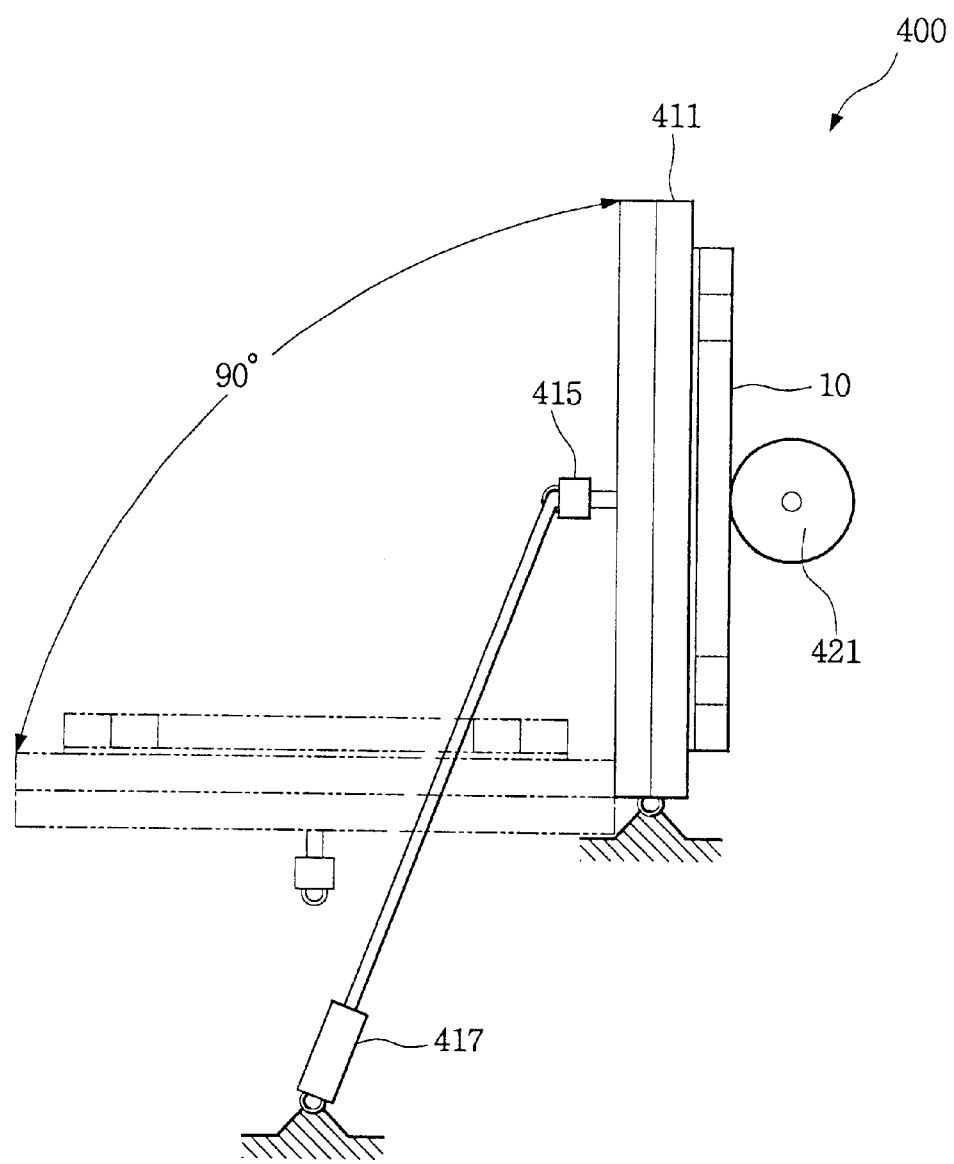
FIG. 3 is a front view showing a conventional wafer sawing apparatus.
Figure 4:
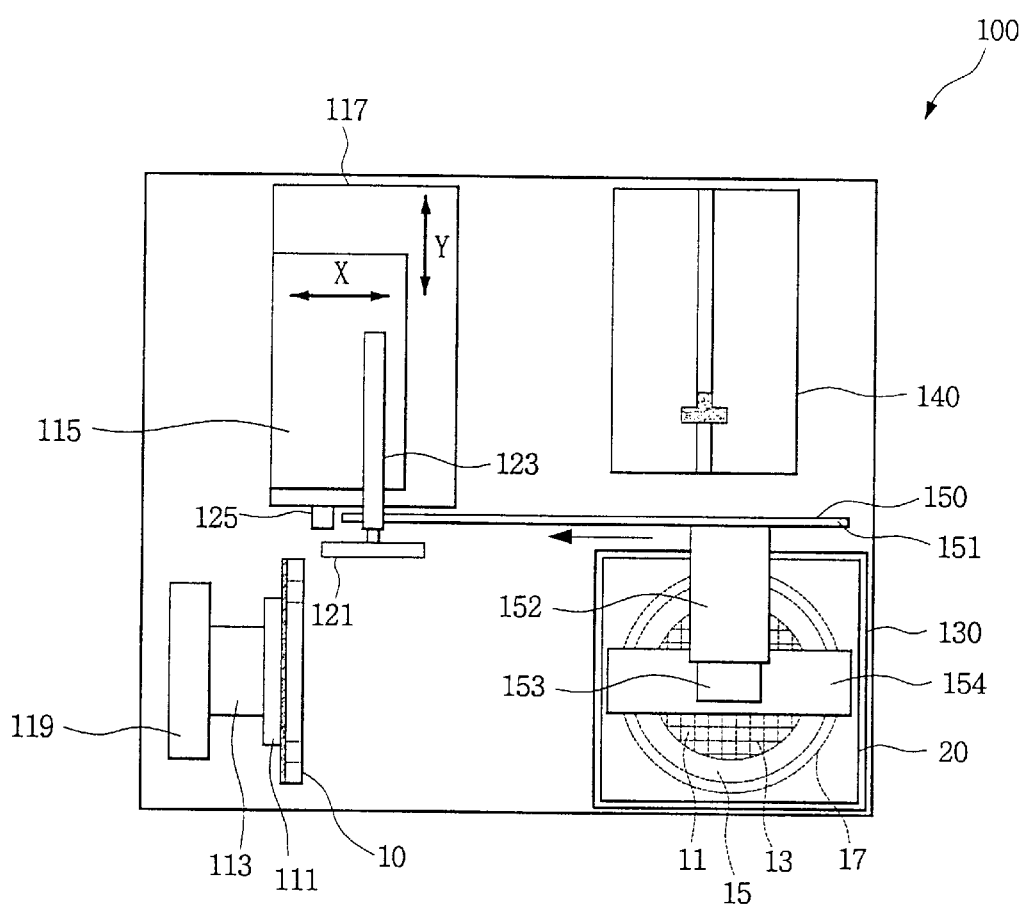
FIG. 4 is a plan view showing a vertical wafer sawing apparatus according to one embodiment of the present invention.
Figure 5:
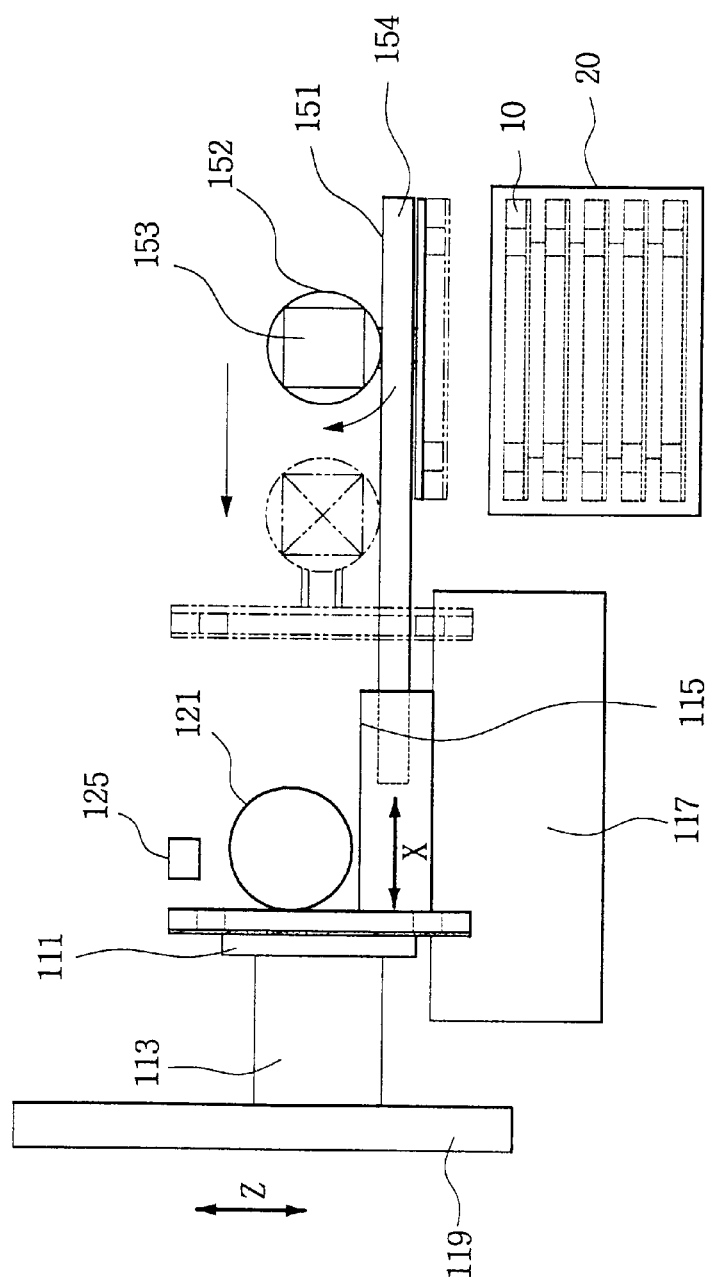
FIG. 5 is a front view showing the vertical wafer sawing apparatus according to another embodiment of the present invention.

FIGS. 4 and 5 illustrate a vertical wafer sawing apparatus according to one embodiment of the present invention.

A wafer sawing apparatus 100 according to this embodiment includes a chuck table 111 on which a wafer 10 is fixedly mounted, and a scribing blade 121 which cuts the wafer 10 along scribe lines 13 in order to divide the wafer 10 into chips 11. The wafer sawing apparatus 100 further includes transporters 140, 150 for transferring the wafer 10 between the chuck table 11 and the wafer cassette 20. The spray nozzle 125 is positioned on the top surface of the wafer 10 so as to remove silicon particles and dust generated during the sawing process.

The chuck table 111 is positioned parallel to the y-z plane, so the wafer 10 fixed on the chuck table 111 is also parallel to the y-z plane. The chuck table 111 can be rotated about the x-axis by rotation driver 113 and moved along the direction of z-axis by a z-axis driver 119.

The scribing blade 121 is oriented parallel to the x-z plane, and rotates about the y-axis at high speed with a driving motor 123. The scribing blade 121 is moved in the direction of the x-axis by an x-axis driver 115 and in the direction of the y-axis by a y-axis driver 117. Herein, the x-axis runs parallel to the ground (the support surface for the chuck table) and perpendicular to the chuck table, and the y-axis is parallel to both the ground and to the chuck table 111.

As discussed, wafer Sawing Apparatus 100 includes the first transporter 140 and the second transporter 150. The first transporter 140 transfers the wafer 10 into or out of the wafer cassette 20. The second transporter 150 transfers the wafer 10 to the chuck table 111. The second transporter 150 comprises an x-axis transporter 151, a z-axis transporter 153, a rotator 152 and a picker 154.

When the wafer 10 is transferred onto a loader 130 from the wafer cassette 20 by the first transporter 140, the z-axis transporter 153 lifts the wafer 10 while the picker 154 on the second transporter 150 secures wafer 10 with suction. The wafer 10 is then transferred by the x-axis transporter 151. The rotator 152 is spun 90° about the y-axis so wafer 10 is oriented parallel to chuck table 111. The wafer 10 is then moved by the x-axis transporter 151 to chuck table 111 and fixed on the chuck table 111 so that the wafer 10 disposed on the chuck table 111 is oriented perpendicular to the ground. The scribing blade 121 is moved to the appropriate position, e.g., a starting point where the wafer cutting process starts, by y-axis driver 117. Then, chuck table 111 is moved to the appropriate position by z-axis driver 119. The depth of the cut is controlled by x-axis driver 115. When the scribing blade 121 begins cutting, the z-axis driver 119 moves the wafer 10 across the scribing blade 121 so that a scribe line 13 is cut. This process can be repeated for every horizontal scribe line 13.

When the wafer 10 is completely sawed along the horizontal scribe lines, the chuck table 111 is rotated by the rotation driver 113 by approximately 90° and the aforesaid process starts again for the vertical scribe lines 13. During the sawing process spray nozzle 125, which is positioned laterally beside the scribing blade 121, sprays a washing solution onto the scribing blade and the top surface of the wafer in order to remove contaminants such as silicon particles or dust.

Figure 6:
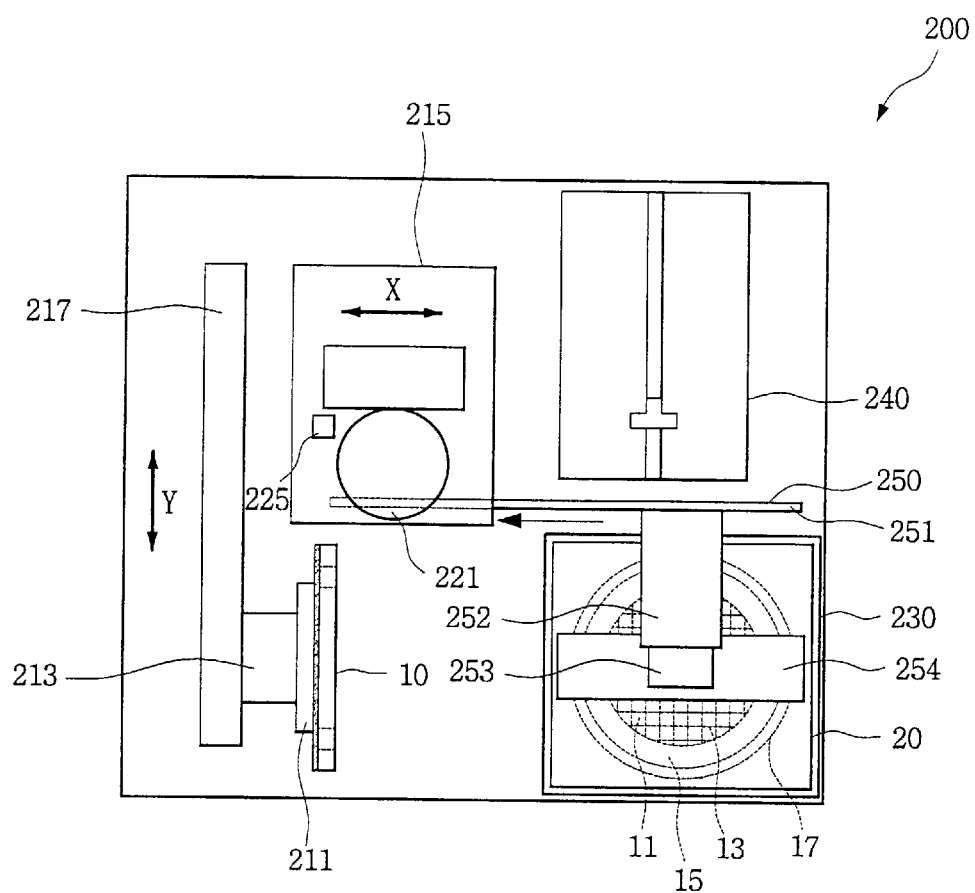
FIG. 6 is a plan view showing a vertical wafer sawing apparatus according to yet another embodiment of the present invention.
Figure 7:
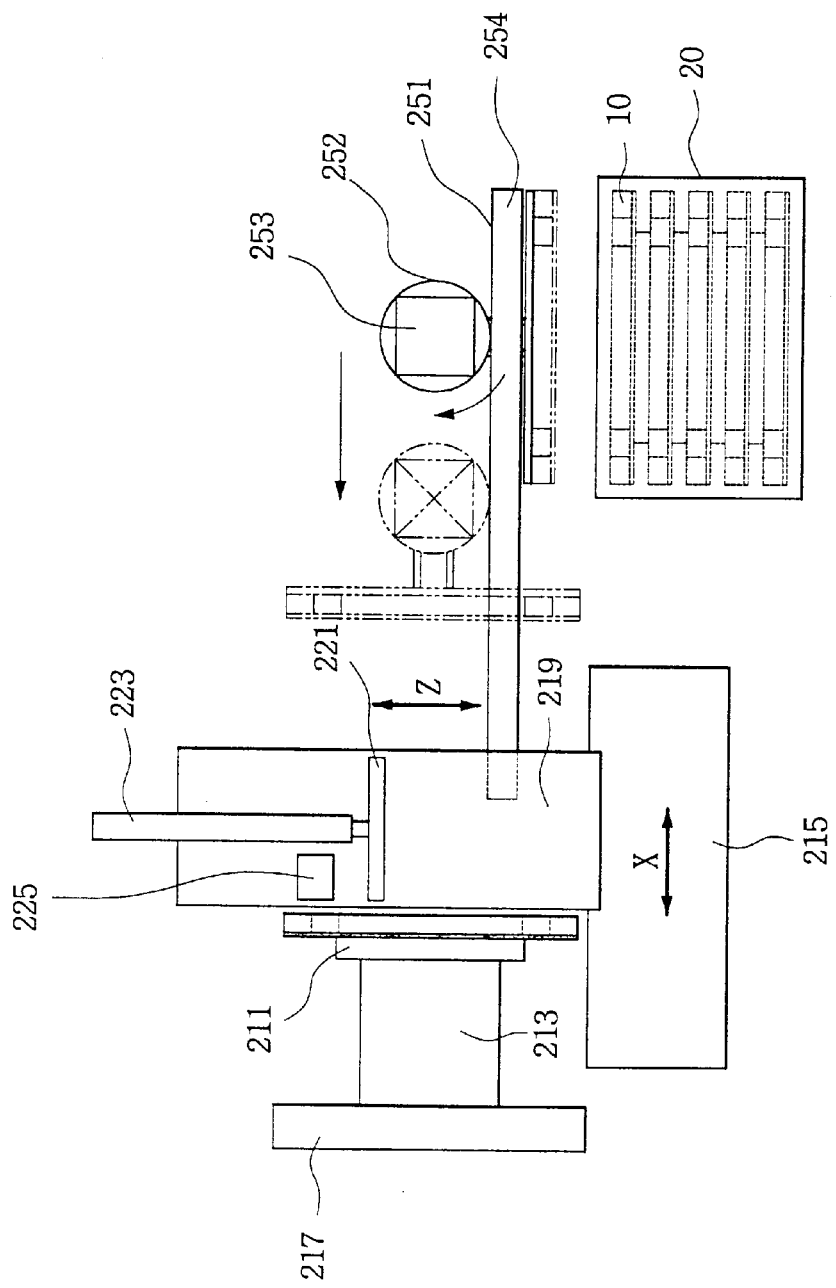
FIG. 7 is a front view showing the vertical wafer sawing apparatus according to another embodiment of the present invention.

FIGS. 6 and 7 illustrate a vertical wafer sawing apparatus according to another embodiment of the present invention.

The vertical wafer sawing apparatus 200 according to another embodiment of the present invention is similar to the above stated embodiment of the present invention. For example, transporters 230 and 240 are the same as those shown previously in FIGS. 4 and 5. (130 and 140). On the other hand, this embodiment is different in that the wafer sawing apparatus 200 comprises the y-axis driver 217, the x-axis driver 215 and the z-axis driver 219. The y-axis driver 217 moves the chuck table 211 in the direction of the y-axis, and the x-axis driver 215 and the z-axis driver 219 move the scribing blade 221 to the direction of the x-axis and the z-axis, respectively. Once more, the scribing blade 211 is oriented perpendicular to the chuck table 211, but this time it is parallel to the ground. During the sawing process, the spray nozzle 225, which is positioned laterally to the scribing blade 221, sprays washing solution onto the scribing blade 221 and the top surface of the wafer 10.

The chuck table 211 is moved to the scribe line starting point by the y-axis driver 217. Sawing depth of the wafer 10 is controlled by the x-axis driver 215. After moving the chuck table 211, the scribing blade 221 is moved by the x-axis driver 215 and the z-axis driver 219, then the wafer 10 separates into individual semiconductor chips 11.

Figure 8:
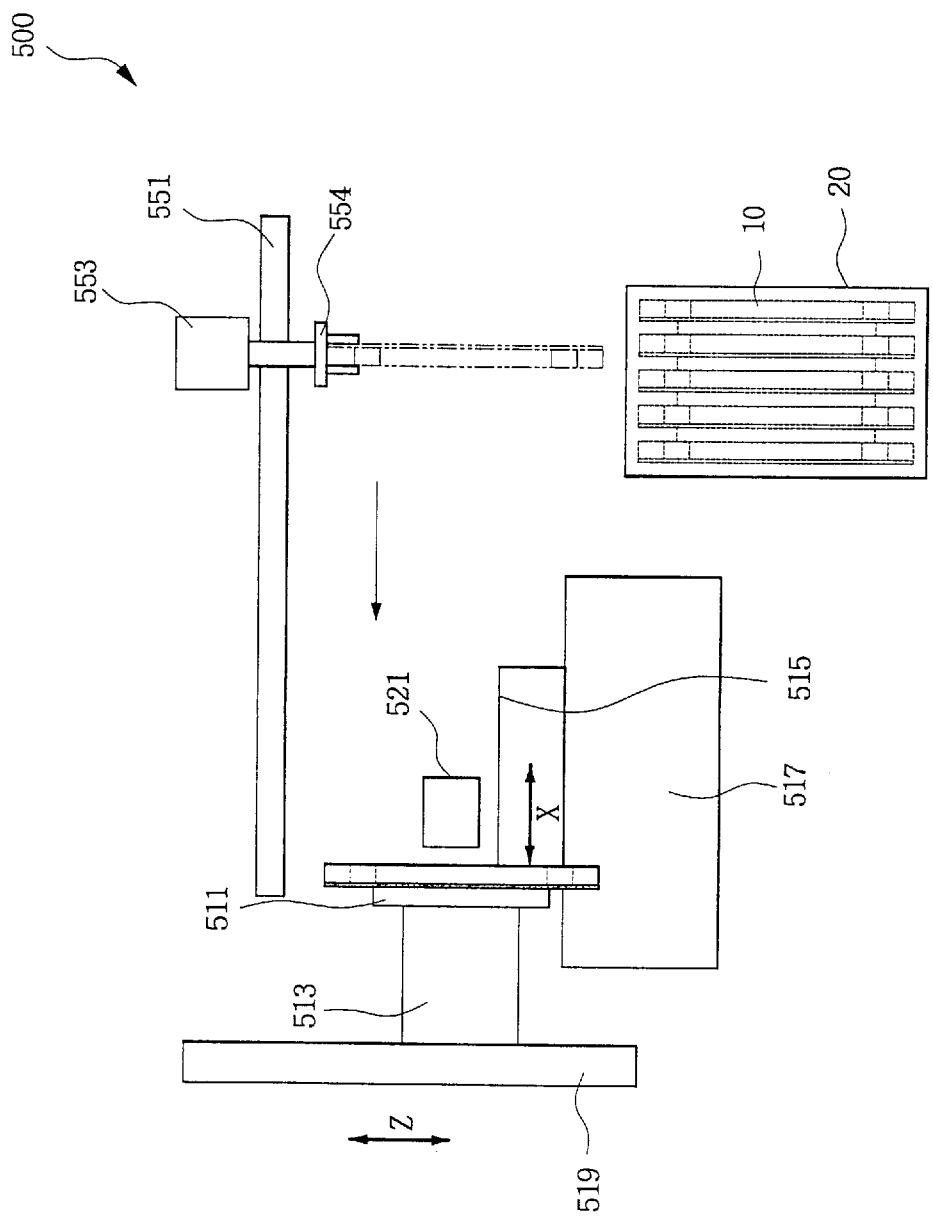
FIG. 8 is a plan view showing a vertical wafer sawing apparatus according to still another embodiment of the present invention.

FIG. 8 illustrates a vertical wafer sawing apparatus 500 according to still another embodiment of the present invention.

The vertical wafer sawing apparatus 500 according to another embodiment of the present invention is similar to the above stated embodiments of the present invention.

However, in this embodiment, the wafer sawing apparatus 500 has a laser cutter 521 instead of the scribing blade. The wafer sawing apparatus 500 has a second transporter comprising an x-axis transporter 551, a z-axis transporter 553 and a picker 554. Additionally, it is necessary to stack the wafer cassette 20 so that the wafer 10 is oriented vertically to the ground.

After stacking the wafer cassette 20, the picker 554 runs vertically by the z-axis transporter 553. Additionally, the picker 554 clamps the wafer 10 and picks up the wafer 10 from the wafer cassette 20. Then, the x-axis transporter 551 moves the picker 554, which clamps the wafer 10, to the chuck table 511. The transferred wafer 10 is fixed on the chuck table 511 and separated into individual semiconductor chips 11 by a laser cutter.

The aforesaid vertical wafer sawing apparatus according to several embodiments of the present invention all have the chuck table positioned so that the face of the wafer 10 is in a plane perpendicular to the ground. Therefore, as wafers increase in size, the height of the wafer sawing apparatus increases also. For example, the wafer sawing apparatus increases about 1.49 square-meters (1.3 m' 1.15 m) in the case of 300 mm diameter wafers (namely, 12-inch wafers). So the total dimension can be decreased by about 42% compared with the conventional wafer sawing apparatus described.

Furthermore, the conventional wafer sawing apparatus needs additional space so that both the chuck table and the scribing blade can move along scribe lines during the sawing of the wafer. The additional space needs to be greater than the diameter of wafer. However, the vertical wafer sawing apparatus according to preferred embodiments of the present invention does not need the additional space since the scribe lines of the wafer are separated by the blade rotating in the z-axis direction. Therefore total dimension for the wafer sawing apparatus does not increase in proportion to increasing wafer size.

Further, the vertical wafer sawing apparatus of the preferred embodiment of the present inventions has at least one scribing member, i.e. a scribing blade moved by the driving motor or a laser. It is further possible to stack the wafer cassettes vertically on the loader or to stack the wafer vertically in the wafer cassette. After completely stacking, the transporter moves the wafers vertically in a stacked condition. The dimensions of the wafer sawing apparatus can be decreased since it no longer requires the first transporter. The vertical wafer sawing apparatus according to preferred embodiments of the present invention can be useful to some sawing processes of the wafer-level-packages, chip-scale packages and unit substrates.

Although the present invention has been described in detail herein above with respect to the preferred embodiments thereof, many variations and/or modifications thereof will be apparent to those of ordinary skill in the art. Therefore, all such variations and modifications are seen to fall within the true spirit and scope of the present invention as defined by the appended claims.

What is claimed is:

1. A vertical wafer sawing apparatus for singulating a wafer having a plurality of semiconductor chips formed therein and a plurality of scribe lines each formed between the adjacent chips, said apparatus comprising:

a chuck table having a first surface for mounting the wafer having a front surface, and a second surface to which a driving member is connected, said first and second surfaces being disposed substantially vertically to a support surface for the chuck table;

a scribing member for dicing the wafer on the scribe lines into a plurality of individual chips; and a transporting member for transferring and mounting the wafer to the chuck table, the wafer being fixedly supported relative to the chuck table by said transporting member in an upright position.

2. The apparatus of claim 1, wherein the transporting member includes a rotator to turn the wafer approximately 90° to arrange the wafer parallel to the chuck table.

3. The apparatus of claim 1, wherein the transporting member moves in the direction of the x-axis, y-axis or z-axis, said x-axis and y-axis run parallel to the support surface for the chuck table, said z-axis runs vertical to the support surface for the chuck table, said x-axis and said y-axis being perpendicular to one another.

4. The apparatus of claim 1, wherein said scribing member is one or more scribing blades rotated by the driving member.

5. The apparatus of claim 4, wherein said one or more scribing blades are oriented vertically.

6. The apparatus of claim 4, wherein said one or more scribing blades are oriented horizontally.

7. The apparatus of claim 1, wherein said scribing member is a laser cutter.

8. The apparatus of claim 1, wherein the scribing member moves along one or more of three orthogonal axes.

9. The apparatus of claim 8, wherein the scribing member moves along two perpendicular horizontal axes.

10. The apparatus of claim 1, wherein the driving member moves along one or more of three orthogonal axes.

11. The apparatus of claim 10, wherein the driving member moves along a vertical axis.

12. The apparatus of claim 1, wherein said scribing member moves perpendicular to the front surface of the wafer.

13. The apparatus of claim 1, wherein said chuck table is rotated by a rotation driver.

\* \* \* \* \*

UNITED STATES PATENT AND TRADEMARK OFFICE
CERTIFICATE OF CORRECTION

PATENT NO.    : 6,662,799 B2
DATED         : December 16, 2003
INVENTOR(S)   : Kim et al.

It is certified that error appears in the above-identified patent and that said Letters Patent is hereby corrected as shown below:

Title page,
Item [56], References Cited, U.S. PATENT DOCUMENTS, should read
-- 5,217,501    6/1993      Fuse et al.
   5,671,530    9/1997      Combs et al.
   5,933,902    8/1999      Frey
   5,976,306    11/1999     Davis et al. --.
FOREIGN PATENT DOCUMENTS, should read
-- 05-129415    May 25, 1993    Japan
   07-045562    Feb. 14, 1995   Japan
   10-092772    Oct. 4, 1998    Japan --
OTHER PUBLICATIONS, should read
-- English language abstract for Japanese Patent Publication No. 05-129415.
English language abstract for Japanese Patent Publication No. 07-045562.
English language abstract for Japanese Patent Publication No. 10-092772. --.

Signed and Sealed this

Third Day of August, 2004

JON W. DUDAS
*Acting Director of the United States Patent and Trademark Office*